US010162065B2

(12) United States Patent
Stassun et al.

(10) Patent No.: US 10,162,065 B2
(45) Date of Patent: Dec. 25, 2018

(54) GAMMA RAY SPECTROSCOPE FOR DETERMINING A COMPOSITION OF AN ASTEROID OR THE REGOLITH OF THE ASTEROID

(71) Applicant: Vanderbilt University, Nashville, TN (US)

(72) Inventors: Keivan Stassun, Nashville, TN (US); Arnold Burger, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 28 days.

(21) Appl. No.: 15/417,659

(22) Filed: Jan. 27, 2017

(65) Prior Publication Data

US 2017/0219721 A1    Aug. 3, 2017

Related U.S. Application Data

(60) Provisional application No. 62/288,803, filed on Jan. 29, 2016.

(51) Int. Cl.
| | | |
|---|---|---|
| *G01T 1/20* | (2006.01) | |
| *G01T 1/202* | (2006.01) | |
| *G01T 1/36* | (2006.01) | |

(52) U.S. Cl.
CPC .......... *G01T 1/2018* (2013.01); *G01T 1/2023* (2013.01); *G01T 1/36* (2013.01)

(58) Field of Classification Search
CPC ..... G01T 1/2018; G01T 1/208; G01T 1/2023; G01T 1/248

USPC .......................................................... 250/362
See application file for complete search history.

(56) References Cited

U.S. PATENT DOCUMENTS

| | | | |
|---|---|---|---|
| 8,580,149 B2 | 11/2013 | Burger et al. | |
| 2010/0268074 A1* | 10/2010 | Van Loef | A61B 6/032 600/431 |
| 2013/0327947 A1* | 12/2013 | Ronda | G01T 1/1644 250/362 |
| 2014/0008550 A1* | 1/2014 | Williams | C09K 11/616 250/483.1 |
| 2016/0111774 A1* | 4/2016 | Platzer | G01R 31/041 343/711 |

(Continued)

OTHER PUBLICATIONS

Perea et al., Scintillation properties of SrI2(Eu2+) for high energy astrophysical detectors: Nonproportionality as a function of temperature and at high gamma-ray energies, Oct. 28, 2014, Journal of Astronomical Telescopes Instruments and Systems, vol. 1, Issue 1, doi: 10.1117/1.JATIS.1.1.016002.*

(Continued)

*Primary Examiner* — David Porta
*Assistant Examiner* — Gisselle Gutierrez
(74) *Attorney, Agent, or Firm* — Meunier Carlin & Curfman LLC (57) ABSTRACT

Disclosed and described herein are embodiments and methods of use of a gamma ray spectroscope. In one aspect the gamma ray spectroscope comprises a scintillator for receiving radiation and a solid-state photomultiplier for detecting and amplifying light emitted by the scintillator in response to the received radiation, wherein an electrical output signal is provided by the photomultiplier that is proportional to the received radiation.

16 Claims, 9 Drawing Sheets

(56) References Cited

U.S. PATENT DOCUMENTS

2017/0227351 A1* 8/2017 Hyland .................. G01P 15/00
2017/0374297 A1* 12/2017 Jhabvala .................. H04N 5/33

OTHER PUBLICATIONS

Burger, et al., "Gamma Ray Spectrometers & Imaging Arrays", Presented at the Astro-Materials Third Mini-Workshop on Astro-Materials on Dec. 4, 2015, 24 pages.

Egner, et al., "Integration of a 6LiInSe2 Thermal Neutron Detector into a CubeSat Instrument", J. Astron. Telesc. Instrum. Syst. 2(4), Published Nov. 8, 2016, 14 pages.

Prettyman, et al., "Elemental composition of the lunar surface: analysis of gamma ray spectroscopy data from Lunar Prospector", J. Geophys. Res. 111, E12007, 2006.doi:10.1029/2005JE002656, 41 pages.

Prettyman, et al., "Ultra-bright scintillators for planetary gamma-ray spectroscopy", SPIE, Oct. 2015, 4 pages.

Salisbury, "New detector perfect for asteroid mining", Accessed on line: https://news.vanderbilt.edu/2015/11/19/new-detector-perfect-for-asteroid-mining/ Published Nov. 19, 2015, 5 pages.

Stone, "A New Sensor Can Sniff Out Gold Inside Space Rocks", Accessed on line: http://gizmodo.com/a-new-sensor-can-sniff-out-gold-inside-space-rocks-1743803820 Published Nov. 20, 2015, 4 pages.

Szondy, "New gamma-ray spectroscope would reveal what lies within for asteroid miners", Accessed on line http://newatlas.com/vanderbilt-gamma-rays-spectroscope/40563/ Published Nov. 24, 2015, 6 pages.

Yamashita, et al., "The global distribution of calcium on the Moon: Implications for high-Ca pyroxene in the eastern mare region", Earth Planet. Sci. Lett. 353-354, 2012, 93-98.

Zhou, "This One-Pound Gamma-Ray Sensor Can Find Gold on Asteroids" Accessed on line: http://www.theepochtimes.com/n3/1904316-this-one-pound-gamma-ray-sensor-can-find-gold-on-asteroids/ Published Nov. 22, 2015.

* cited by examiner

|  | NaI (Tl) | LaGr$_3$(Ce) | CsI(Tl) | SrI$_2$(Eu) |
|---|---|---|---|---|
| LIGHT YIELD (Ph/MeV) | 38,000 | 65,000 | 54,000 | 85,000 |
| EMISSION PEAK (nm) | 415 | 380 | 550 | 435 |
| PRINCIPAL DECAY (ns) | 230 | 17 | 1000 | 1200 |
| DENSITY (g/cm$^3$) | 3.67 | 5.10 | 4.51 | 4.59 |
| Z$_{eff}$ | 50 | 44 | 54 | 49 |
| MELTING/PROCESS TEMP (°C) | 651 | 783 | 894 | 538 |
| CRYSTAL STRUCTURE | CUBIC | HEXAGONAL | CUBIC | ORTHORHOMBIC |
| EN. RES. W/PMT (% @ 662 keV) | 7% | 2.7% | 8% | 2.5% |

|  |  |  |  |
|---|---|---|---|
| γ ABSORPTION (2"X 3", 662 keV) | 22% | 24% |  |
| SELFACTIIVITY | LA ~ 3X NORM | NONE |  |

GAMMA RAY SPECTROSCOPE FOR DETERMINING A COMPOSITION OF AN ASTEROID OR THE REGOLITH OF THE ASTEROID

CROSS REFERENCE TO RELATED APPLICATION

This application claims priority to and benefit of U.S. provisional patent application Ser. No. 62/288,803 filed Jan. 29, 2016, which is fully incorporated by reference and made a part hereof.

BACKGROUND

The chemical composition of planets and other solar system bodies provides information about their origins and evolution. Small bodies (e.g., asteroids, comets, and the moons of Mars) preserve a record of the early solar system. Indeed, the two largest bodies in the main asteroid belt—Ceres and Vesta—are thought to be surviving members of a population of planetary 'embryos,' from which the planets originally grew These two asteroids are chemically distinct and have followed very different evolutionary paths. Vesta formed under hot conditions and consists of magmatic materials that cooled to form a layered interior (i.e., a core, mantle, and crust). Ceres, however, is a water-rich body that probably formed later—or further away from the Sun—than Vesta. Small asteroids may contain a mixture of materials from different parent bodies. Since some of these smaller asteroids are relatively easy to access (e.g., the near-Earth asteroids), they may be potential targets for mining and exploration. Some are potentially hazardous objects. A thorough understanding of their physical and chemical properties, as well as their interior structure, is required for planetary defense.

Figure 1:
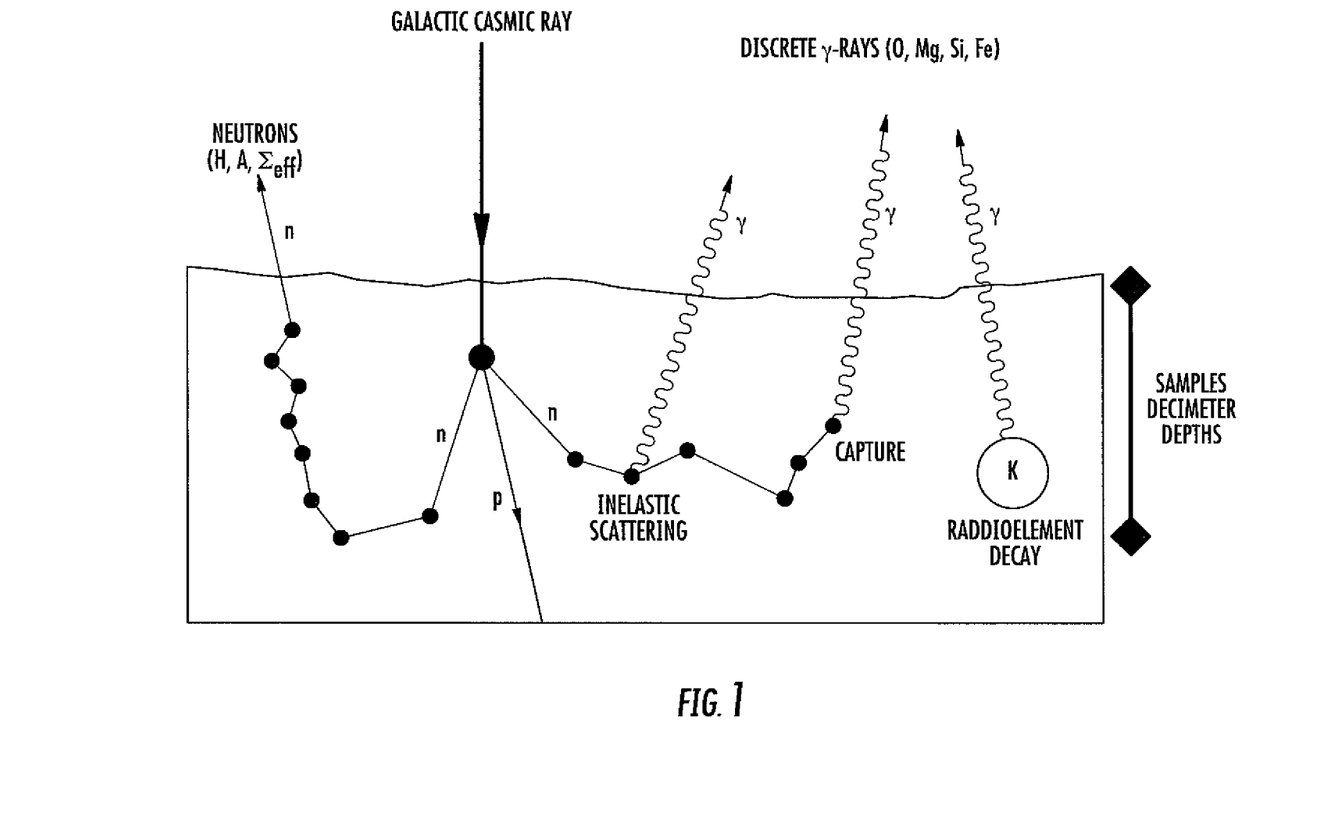
FIG. 1 illustrates gamma-ray production processes in the surface of planetary bodies.

Nuclear spectroscopy is commonly used to determine the elemental composition of the surface of planets, asteroids, and comets. Gamma rays and neutrons are produced by the interaction of galactic cosmic rays with the surface materials on small airless bodies and planets with thin atmospheres, such as Mars (see FIG. 1). FIG. 1 illustrates gamma-ray production processes in the surface of planetary bodies. Galactic cosmic rays—mainly high-energy protons (p)—smash apart atoms in the top surface of airless bodies. This produces a shower of secondary particles, which include neutrons (n). These neutrons then undergo successive collisions with atoms in the surface and produce gamma rays (γ) via inelastic scattering and radiative capture. Gamma rays can also be produced by the decay of natural radioelements, such as potassium (K), thorium (Th), and uranium (U). The spectrum of the gamma rays (see FIG. 2) can be analyzed to determine the concentration of the detected elements. Important rock-forming elements include oxygen (O), magnesium (Mg), silicon (Si) and iron (Fe). In addition, the escaping neutrons convey information about the hydrogen content (H), average atomic mass (A), and the neutron macroscopic capture cross section ($\Sigma_{eff}$) of the surface materials.

Figure 2:
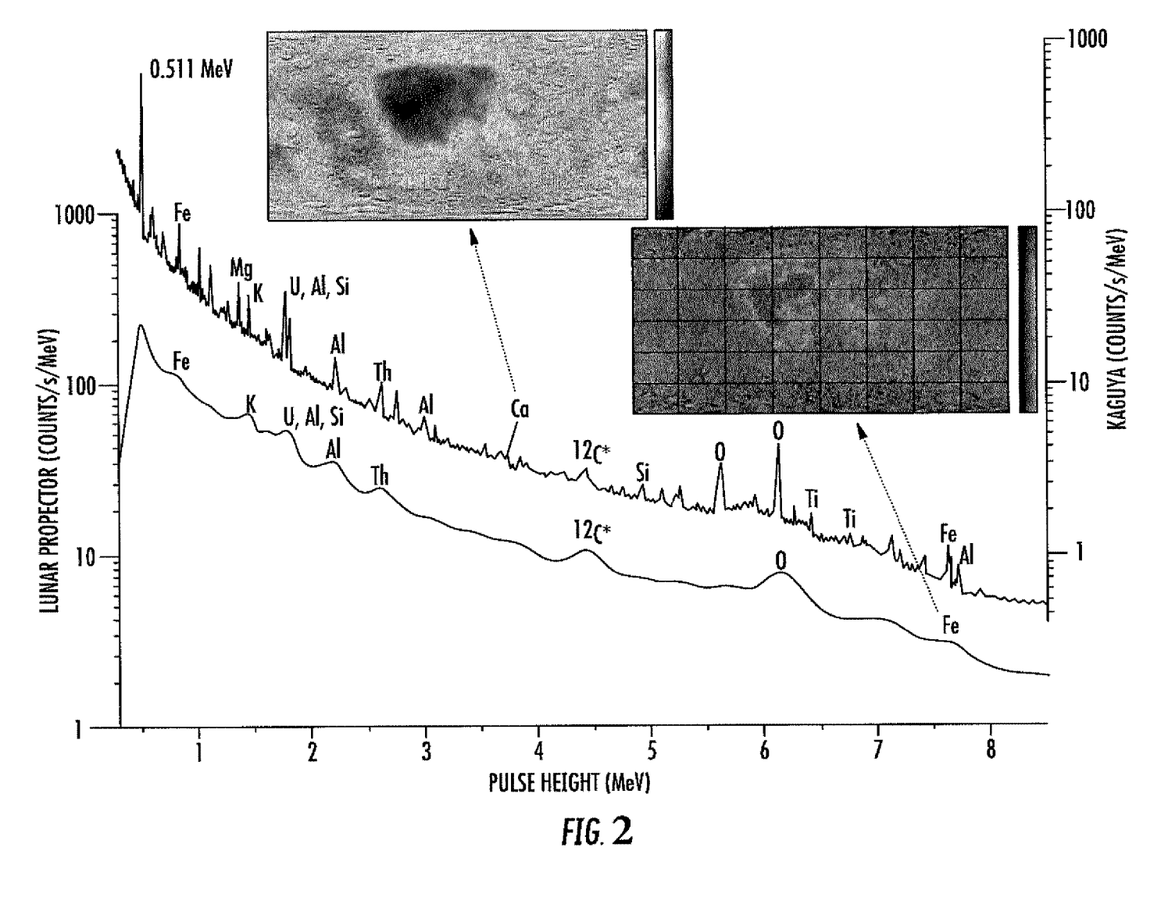
FIG. 2 illustrates a comparison of the average lunar gamma-ray spectrum, as acquired during the Lunar Prospector (bottom graph) and Kaguya (upper graph missions.

Gamma rays produced via interactions with major rock-forming elements (e.g., iron, silicon, magnesium, and aluminum) provide crucial information for geochemical studies. For planets that have thick atmospheres (e.g., Venus) the flux of cosmogenic gamma rays near the surface is relatively low. All natural solar system materials, however, contain long-lived radioelements (e.g., potassium, thorium, and uranium) that are an additional source of characteristic gamma rays. The potassium/thorium ratio of surface materials is a diagnostic measure of a body's bulk composition and can provide information about where and when the planet or asteroid formed. In planetary nuclear spectroscopy experiments, the emitted gamma rays and neutrons are measured by a spectrometer that is deployed either on the surface (i.e., on a rover or lander) or in a close-proximity orbit within about one body radius of its surface. Long accumulation times (months) are normally required to achieve measurements with the precision required to map elemental surface compositions from orbit. A number of missions to the Moon, Mars, Mercury, and the asteroid 4 Vesta have been used to successfully obtain elemental mapping data (see FIG. 2). In situ surface measurements have also been made for Venus, the asteroid Eros, and Mars. FIG. 2 illustrates a comparison of the average lunar gamma-ray spectrum, as acquired during the Lunar Prospector (bottom graph) and Kaguya (upper graph) missions. Bismuth germanate ($BG_O$) was used for the detector in the Lunar Prospector instrument, whereas high-purity germanium (HPGe) was used for the Kaguya spectrometer. Additional information about the data can be found in T. H. Prettyman, J. J. Hagerty, R. C. Elphic, W. C. Feldman, D. J. Lawrence, G. W. McKinney, D. T. Vaniman, Elemental composition of the lunar surface: analysis of gamma ray spectroscopy data from Lunar Prospector, J. Geophys. Res. 111, p. E12007, 2006.doi:10.1029/2005JE002656, and N. Yamashita, O. Gasnault, O. Forni, C. d'Uston, R. C. Reedy, Y. Karouji, S. Kobayashi, et al., The global distribution of calcium on the Moon: implications for high-Ca pyroxene in the eastern mare region, *Earth Planet. Sci. Lett.* 353-354, p. 93-98, 2012, both of which are fully incorporated by reference and made a part hereof. Prominent gamma-ray peaks in the spectra indicate the presence of various elements in the target. These include aluminum (Al), calcium (Ca), and titanium (Ti). The two insets show global maps of iron oxide (right) and calcium oxide (left) created from Lunar Prospector and Kaguya data, respectively. These maps show concentration ranges of 8-20 wt % for calcium oxide and 2-25 wt % for iron oxide. The peak labeled 12C* is made by neutron reactions with oxygen or carbon.

Planetary nuclear spectroscopy applications require that instruments have high gamma-ray detection efficiencies, as well as energy resolutions that are sufficient to distinguish contributions from different elements. The requirement for high efficiency emphasizes the need for large-volume detectors, scintillators, and semiconductors that have relatively high atomic numbers and densities. Cosmogenic and radiogenic gamma-ray emissions from planetary surfaces are relatively weak. Therefore, detectors must have low self-activity levels. For example, gamma rays produced from the decay of radio-lanthanum in the scintillator lanthanum bromide (LaBr3) can obscure gamma-ray emissions from the Moon. In addition, the harsh radiation conditions of space mean materials that are insensitive to radiation damage, or for which the damage can be mitigated (e.g., via annealing), are preferable. Spaceflight applications also require simple, low-power, compact, and rugged electronics.

Flight-heritage gamma-ray spectrometers have included various low-resolution scintillators for detection, e.g., bismuth germanate that was flown on the Lunar Prospector and Dawn missions. High-purity germanium (HPGe)—a semiconductor—was used in the gamma-ray spectrometers that were flown on the Kaguya, Mars Odyssey, and MESSENGER missions. The scintillator materials have the advantage of being relatively inexpensive. They can also be deployed at ambient temperatures, although this is at the cost of reduced sensitivity for some elements. HPGe, however, can be used to achieve very high spectral resolutions and therefore provide high levels of elemental sensitivity. This benefit, however, does come with the expense of added complexity, cost, and bulk, which are associated with the necessary cryogenic cooling. Although HPGe is seen as the 'gold standard' for gamma-ray spectroscopy detectors, we highlight that high resolution does not always guarantee optimal instrument performance. Additional performance-limiting factors include the mission concept of operations, design measures to mitigate backgrounds and the deployment of the instrument on the spacecraft.

For additional background material, please refer to "Ultra-bright scintillators for planetary gamma-ray spectroscopy," Thomas Prettyman, Arnold Burger, Naoyuki Yamashita, James Lambert, Keivan Stassun and Carol Raymond, 23 Oct. 2015, SPIE Newsroom. DOI: 10.1117/2.1201510.006162, which is incorporated by reference.

Therefore, what is desired is a gamma-ray spectroscope that overcomes disadvantages in the present state of the art, some of which are described above.

SUMMARY

Figure 3:
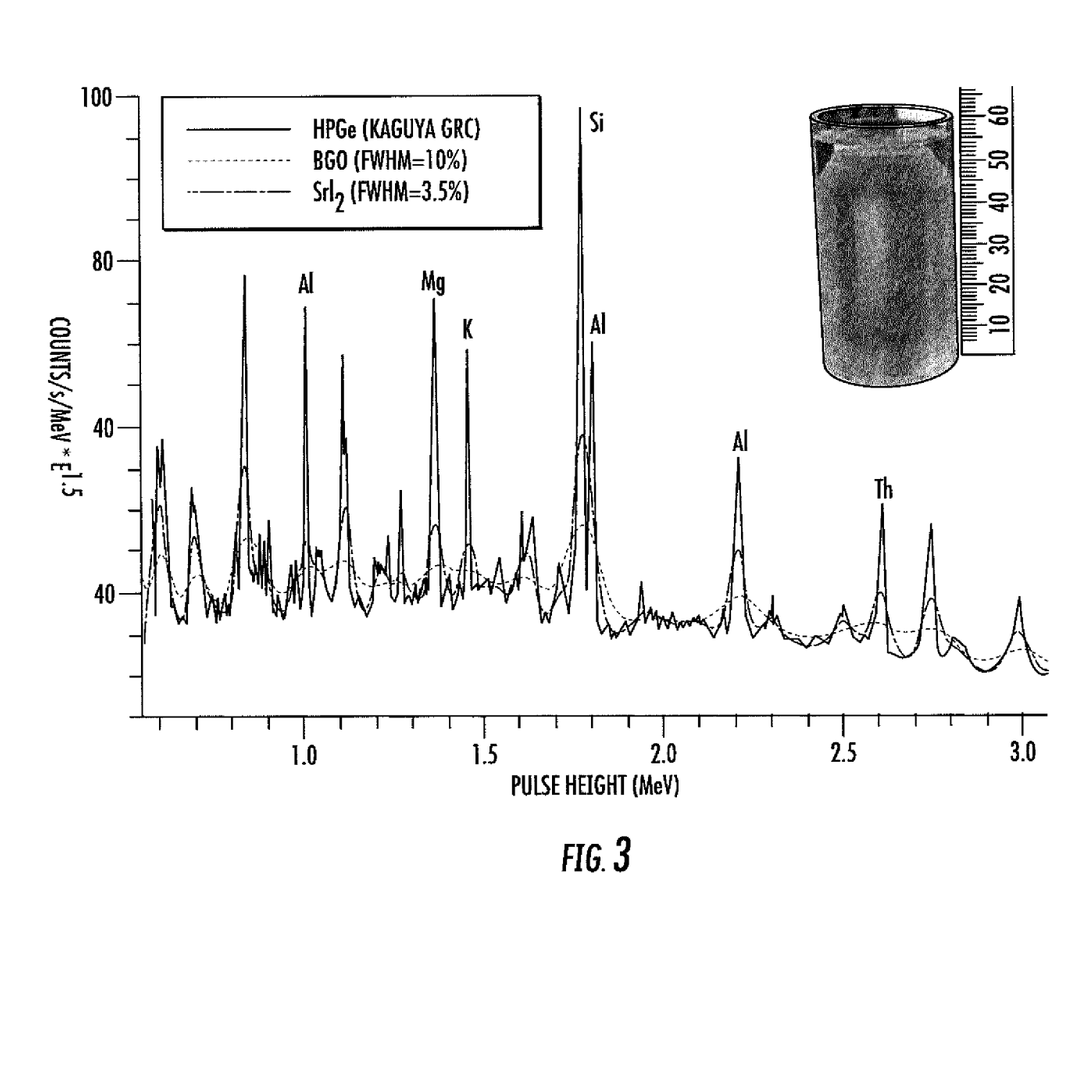
FIG. 3 is an illustration showing how energy resolution affects the ability to extract chemical information from a lunar gamma-ray spectrum.

Described herein are embodiments of a gamma ray spectroscope that overcomes the resolution limitations of scintillator materials with the use of ultra-bright scintillator materials, such as europium-doped strontium iodide and the like. Strontium iodide ($SrI_2$) has a high atomic number (48) and density (4.6 g/cm3), and is thus an excellent candidate for gamma-ray spectroscopy applications. With $SrI_2$ it is possible to achieve very high spectral resolutions (for a scintillator) of about 3% full width at half-maximum, at 662 keV. This is sufficient to resolve key gamma-ray peaks in planetary spectra (see FIG. 3). FIG. 3 is an illustration showing how energy resolution affects the ability to extract chemical information from a lunar gamma-ray spectrum. The whole-Moon spectrum acquired by the Kaguya gamma-ray spectrometer (GRS), which was equipped with a HPGe detector, is shown here. For comparison, it has been degraded to model the performance of BGO and strontium iodide ($SrI_2$) scintillators. The superior resolution of $SrI_2$ enables key gamma-ray peaks to be separated (e.g., for Mg and K). A photograph of a $SrI_2$ crystal that is a suitable size for planetary applications is shown in the inset. The measured energy resolution of this crystal was 3.5% full width at half-maximum (FWHM), at 662 keV (with a photomultiplier tube). In addition, the relevant growth processes can be scaled up to produce large single crystals of this material. A two-inch diameter right-circular cylinder is suitable for planetary applications, and is within the capabilities of current crystal growth technology. Furthermore, the light output from $SrI_2$ is well-matched to solid-state photomultipliers such as silicon photomultipliers (SiPMs). SiPMs are compact and do not require high voltages (unlike their bulky vacuum tube counterparts). The low cost, high-energy resolution, solid-state readout, and absence of self-activity characteristics, as well as the size scalability of $SrI_2$, make this material a good choice for planetary gamma-ray instruments, i.e., compared with other bright scintillators (such as cerium bromide and $LaBr_3$).

Disclosed and described herein are embodiments and methods of use of a gamma ray spectroscope. In one aspect the gamma ray spectroscope comprises a scintillator for receiving radiation; and a solid-state photomultiplier for detecting and amplifying light emitted by the scintillator in response to the received radiation, wherein an electrical output signal is provided by the photomultiplier that is proportional to the received radiation. The scintillator may be comprised of a very high light output material such as Strontium-Iodide doped with Europium, and the like. In various aspects, the solid state photomultiplier may comprise an avalanche photodetector and/or a silicon photodetector. The gamma ray spectroscope can be used to determine a chemical composition of the asteroid or the regolith of the asteroid. In various aspects, the gamma ray spectroscope is used to determine the chemical composition of the asteroid from a location remote from the asteroid; or the gamma ray spectroscope can be used to determine the chemical composition of the asteroid or the regolith of the asteroid when placed on the asteroid. The gamma ray spectroscope is compact, lightweight and has low power consumption. For example, the gamma ray spectroscope may weigh one kilogram or less, one pound or less, and may only have exterior dimensions of 10 cm×10 cm×10 cm, or less. In one aspect, the gamma ray spectroscope consumes three Watts, or less, of electrical power. In another aspect, the gamma ray spectroscope consumes five Watts, or less, of electrical power. The electrical output signal of the gamma ray spectroscope is proportional to the intensity and wavelength of the received radiation.

Another aspect of the invention comprises a system for determining a composition of regolith of an asteroid. One embodiment of the system comprises a scintillator comprised of a $SrI_2$ crystal, wherein the scintillator receives radiation from an asteroid or regolith of the asteroid and emits light in proportion to the received radiation; a silicon photomultiplier, wherein the silicon photomultiplier detects and amplifies light emitted by the scintillator in response to the received radiation and provides an electrical output signal that is proportional to the received radiation; an amplifier, wherein the amplifier receives the electrical output signal form the photomultiplier and amplifies it; a spectrum analyzer, wherein the spectrum analyzer receives the amplified electrical output signal form the amplifier and determines a composition of the asteroid or the regolith of the asteroid based on the amplified electrical output signal; a power supply that provides power to the silicon photomultiplier, the amplifier and the spectrum analyzer; and a CubeSat chassis, wherein the scintillator, the silicon photomultiplier, the amplifier, the spectrum analyzer and the power supply all fit within the CubeSat chassis. The disclosed system can be used to determine the chemical composition of the asteroid or the regolith of the asteroid from a location remote from the asteroid, or the system can be used to determine the chemical composition of the asteroid or the regolith of the asteroid when placed on the asteroid. The disclosed system may weigh one kilogram or less, one pound or less, and the CubeSat chassis may have exterior dimensions of 10 cm×10 cm×10 cm, or less. In one aspect, the system consumes three Watts, or less, of electrical power. In another aspect, the gamma ray spectroscope consumes five Watts, or less, of electrical power.

Yet another aspect of the invention comprises a method of determining a composition of regolith of an asteroid. On embodiment of the method comprises receiving, by a scintillator, radiation from an asteroid or regolith of the asteroid; amplifying, by a solid-state photomultiplier, light emitted by the scintillator in response to the received radiation; providing, by the solid-state photomultiplier, an electrical output signal that is proportional to the received radiation; and determining, by an analyzer, a composition of the asteroid or the regolith or the asteroid based on the electrical output signal. In one aspect, the method may comprise amplifying the electrical output signal using one or more amplifiers before it is received by the analyzer.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 4:
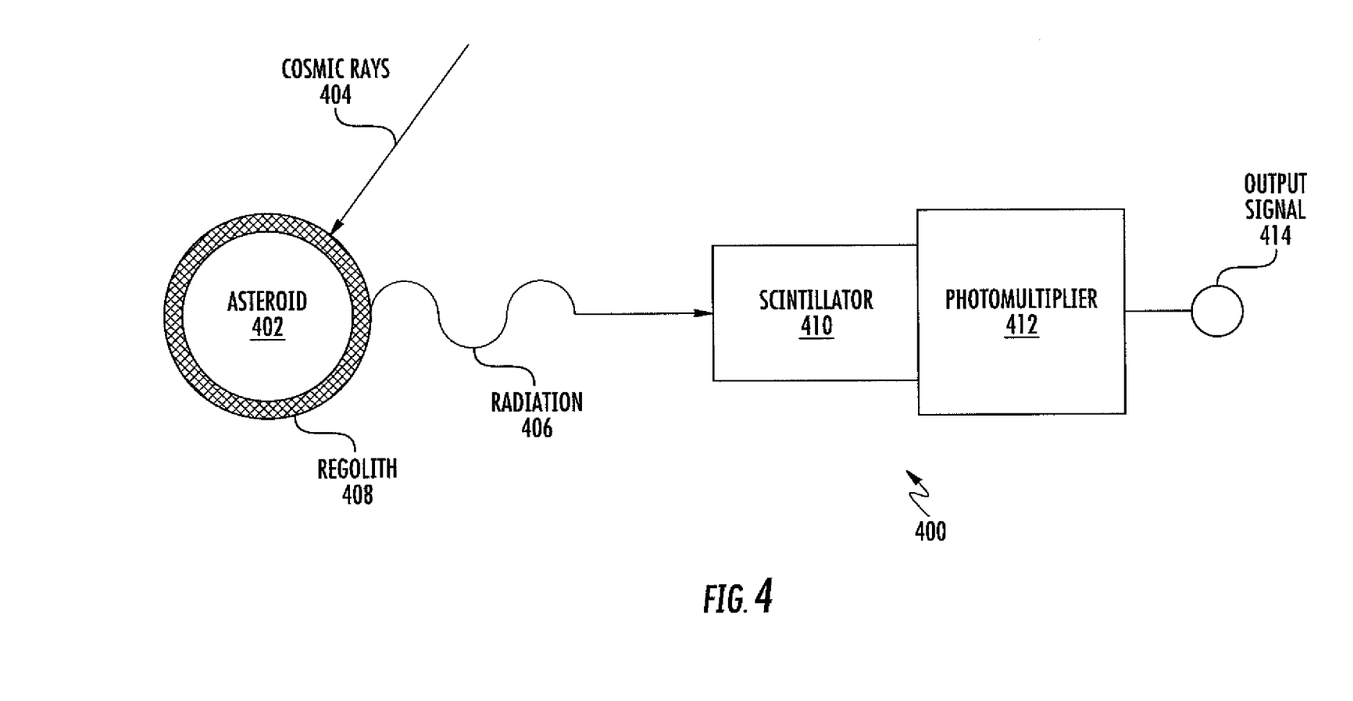
FIG. 4 is an illustration of an exemplary gamma ray spectroscope 400.

FIG. 4 is an illustration of an exemplary gamma ray spectroscope 400. As shown in FIG. 4, asteroids 402 and other celestial bodies are struck by cosmic rays 404. Gamma rays and neutrons (radiation 406) are produced by the interaction of the galactic cosmic rays 404 with the surface materials (regolith 408). By detecting the emitted radiation 406 with a gamma ray spectroscope 400, the chemical composition of the regolith 408 and/or the solid core of the asteroid 402 or other celestial body can be determined. As shown in FIG. 4, one embodiment of the gamma ray spectroscope 400 comprises a scintillator 410 for receiving the radiation 406, and a solid-state photomultiplier 412 for detecting and amplifying light emitted by the scintillator 410 in response to the received radiation 406. The photomultiplier 412 provides an electrical output signal 414 that is proportional to the received radiation 406. Though not shown in this figure, the electrical output signal 414 can be used by a spectrum analyzer to determine the chemical composition of the regolith 408 and/or core material of the asteroid 402 or other body that emitted the radiation 406. Generally, the electrical output signal 414 is proportional to the intensity and wavelength of the received radiation.

Figure 5:
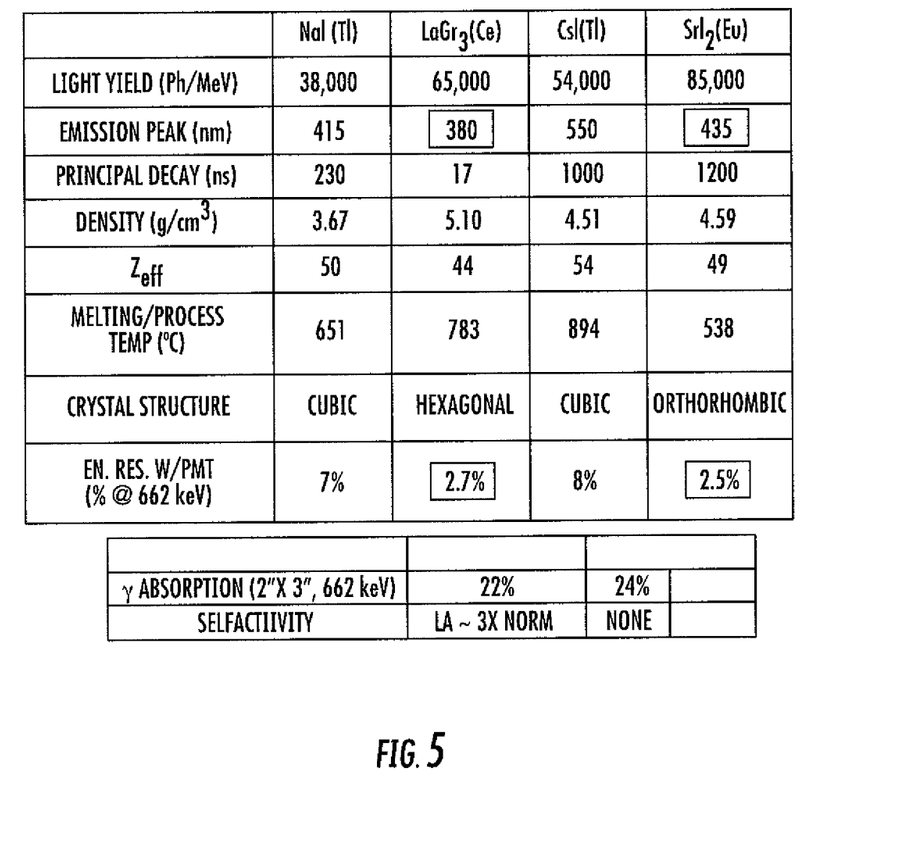
FIG. 5 is a non-limiting listing of some materials that can comprise the scintillator and properties of the materials.

As shown in FIG. 4, the scintillator 410 is comprised of a very high light output (i.e., "bright") material. A non-limiting listing of some materials that can comprise the scintillator and properties of the materials are shown in FIG. 5. Such materials include sodium iodide doped with thallium (NaI(Tl)), cerium-doped lanthanum bromide ($LaBr_3(Ce)$), thallium-doped cesium iodide (CsI(Tl)), and europium-doped strontium-iodide ($SrI_2(Eu)$), lithium indium diselenide ($^6LiInSe_2$), among others. An advantage of using materials such as those shown in FIG. 5 is that they are operable at higher temperatures and do not require the cryogenic cooling of other scintillator materials such as bismuth germanate or high-purity germanium (HPGe). A gamma ray spectroscope 400 comprising a scintillator 410 of the materials described herein can operate close to room temperature. For example, such a gamma ray spectroscope 410 may operate in a temperature range of −5 C to 30 C. In one aspect, $SrI_2(Eu)$ is used for the scintillator material. $SrI_2(Eu)$ has the useful properties of a high stopping power for gammas rays in the range of 10 keV to 10 MeV; blue emission making it ideal to be used in conjunction with a solid state photodetector readout thus reducing the overall power consumption and size of the spectroscope; a high energy resolution allowing a detection sensitivity that is sufficient to detect the elements of interest; little or no self-activity; a high degree of light yield proportionality; low cost; and a high threshold for radiation damage.

Regarding the solid-state photomultiplier 412 of FIG. 4, it may be comprised of an avalanche photodetector. For example, the solid-state photomultiplier 412 may comprise a silicon photodetector. An advantage of a solid-state photomultiplier is its ability to detect the light output of bright scintillator materials very well. In other words, it scintillator 410 and the photodetector 412 should be matched such that the scintillator transduces gamma radiation into light signals that are well-matched to the response curve of the photodetector. In one aspect, the peak emission of the scintillator is within 15 nm from the maximum of the response curve of the photodetector. For example, as noted above the blue light emission from a $SrI_2(Eu)$ scintillator is readily detectable by a solid-state photomultiplier, thus reducing overall power consumption and size of the spectroscope 400. For example, the gamma ray spectroscope weighs one kilogram or less, one pound or less and it may consume 3 Watts, or less, of electrical power. In another example, the gamma ray spectroscope consumes five Watts, or less, of electrical power. In one aspect, the gamma ray spectroscope can have exterior dimensions of 10 cm×10 cm×10 cm, or less. Because of its small size, weight and low power requirements, embodiments of the gamma ray spectrometer can be used in either remote sensing (satellite) mapping of the composition or on board of a rover that will raster the surface of the object (planet, moon, asteroid) and locate and identify the composition.

Figure 6A:
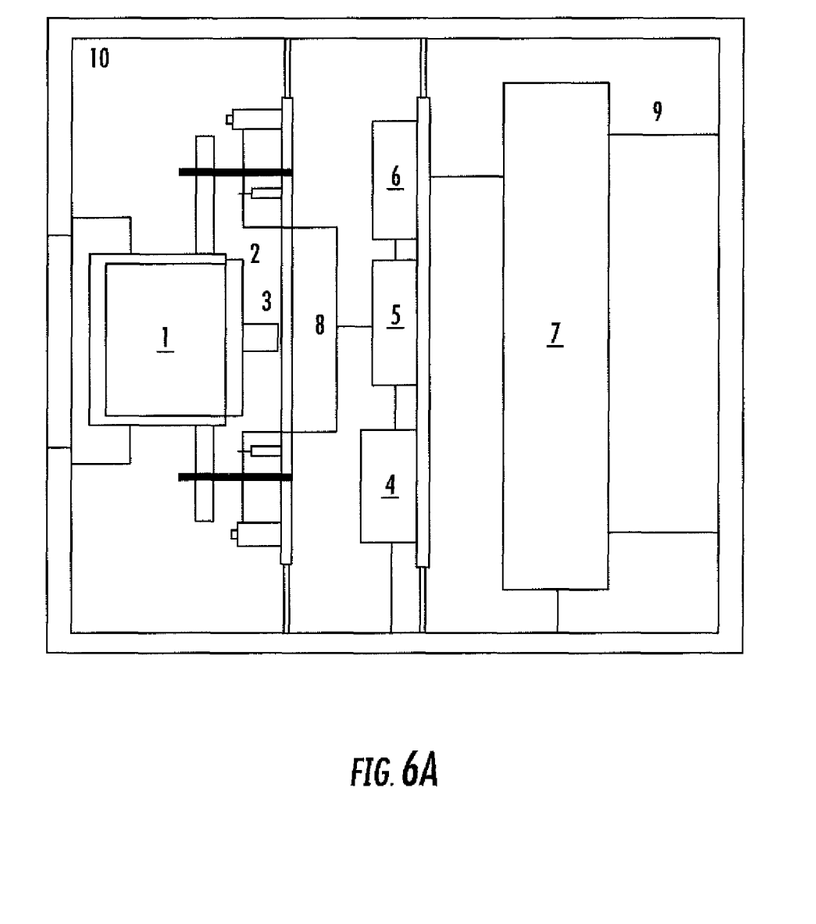
FIG. 6A illustrates an example of a gamma-ray spectroscope system.
Figure 6B:
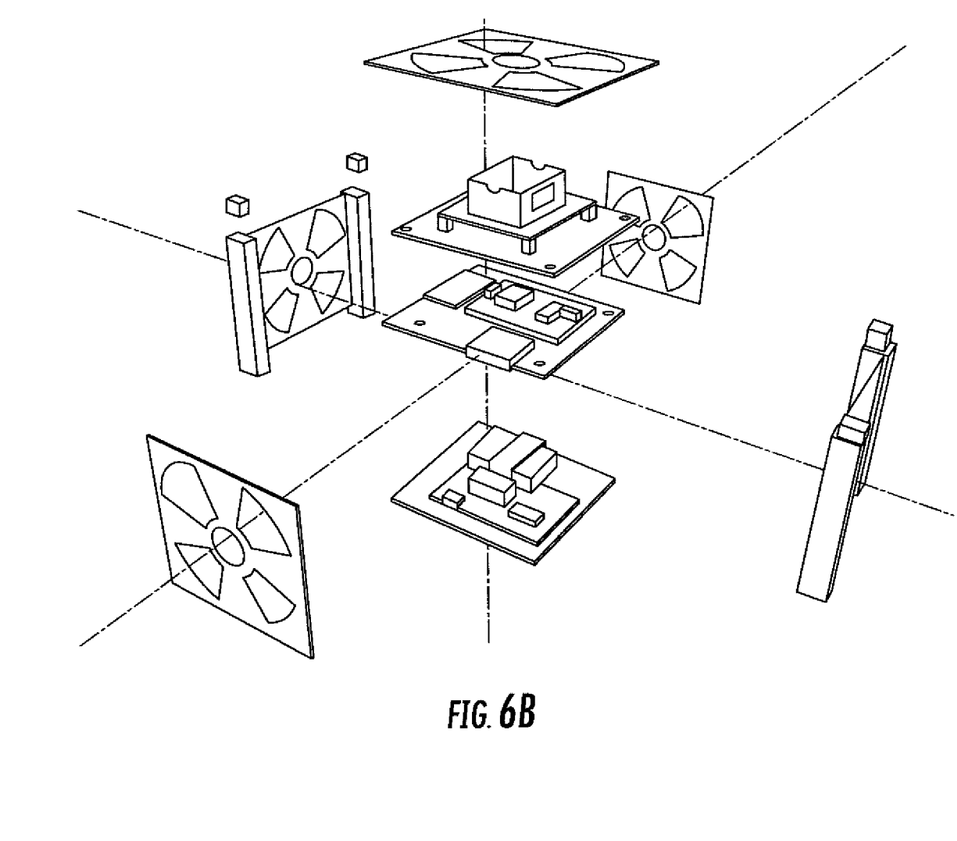
FIG. 6B is an exploded view of the components that comprise the example system of FIG. 6A.

FIG. 6A illustrates an example of a gamma-ray spectroscope system. The system is a scintillator comprised of a $SrI_2$ crystal 1 and a silicon photomultiplier 2 such as a SensL ArrayC-30035-16P-PCB photomultiplier mounted on a test board 3. Further comprising the system is a power supply 4, a preamplifier 5, and a shaping amplifier. The preamplifier 5 may be, for example, a Cremat CR-110 preamplifier and the amplifier 6 may be, for example, a Cremat shaping amplifier CR-200-4 μs. The amplified electrical signal is provided to a spectrum analyzer 7 such as, for example, a Kromek K102 multi-channel analyzer. Generally, the analyzer 7 comprises a computing device such as that shown in FIG. 8, below, that is configured to determine a composition of the regolith of the asteroid. Further comprising the system of FIG. 6A is wiring 8 and brackets 9 such that the system can be mounted and contained with a CubeSat chassis 10. NASA's CubeSat Launch Initiative is a platform that allows researchers to compete for flight opportunities to conduct low cost space science experiments. Instruments can be from one to six units (U), with some sub-increments of 0.5 units available, with specific weight, size, and power requirements that can be found on www.cubesat.org. The criteria for a 1.5 U include the size of 10 cm×10 cm×15 cm, a weight limit of 2.00 kg (4.4 lbs.), and requirement to run off the power supplied by onboard solar panels or batteries. FIG. 6B is an exploded view of the components that comprise the example system of FIG. 6A.

Figure 7:
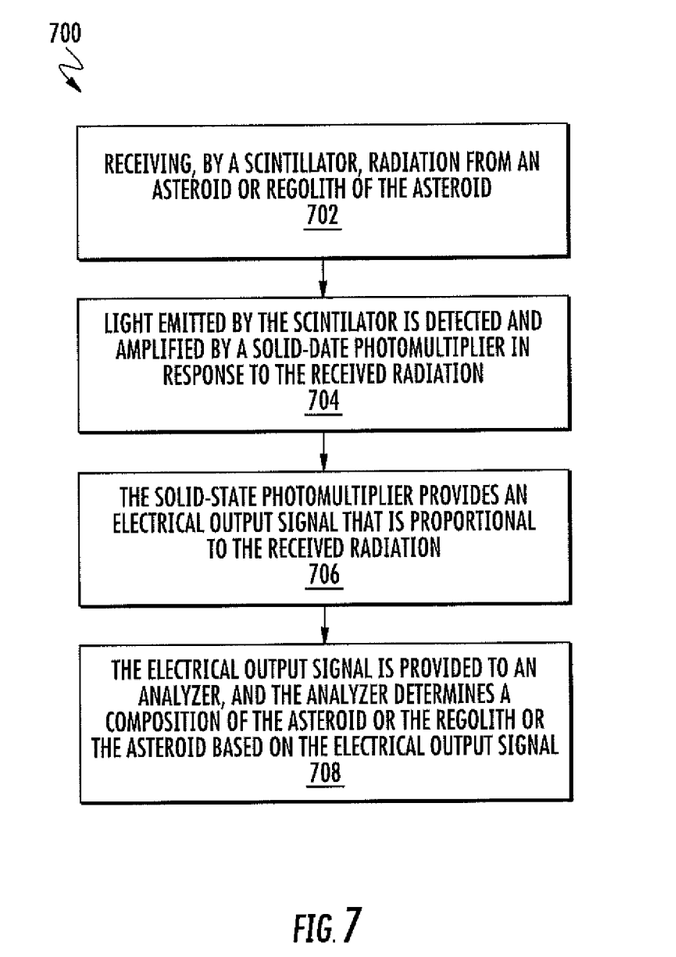
FIG. 7 is a flowchart that illustrates an exemplary method of determining a composition of an asteroid or the regolith of the asteroid.

FIG. 7 is a flowchart that illustrates an exemplary method of determining a composition of regolith of an asteroid. In FIG. 7, the method comprises 702, receiving, by a scintillator, radiation from an asteroid or regolith of the asteroid. In one aspect, the scintillator is comprised of a very high light output material. In one aspect, the very high light output material comprises Strontium-Iodide doped with Europium, and the like. At 704, light emitted by the scintillator is detected and amplified by a solid-state photomultiplier in response to the received radiation. In one aspect, the solid state photomultiplier comprises an avalanche photodetector. In one aspect, the solid state photomultiplier comprises a silicon photodetector. At 706, the solid-state photomultiplier provides an electrical output signal that is proportional to the received radiation. In one aspect, the electrical output signal may be amplified by an amplifier. At 708, the electrical output signal is provided to an analyzer, and the analyzer determines a composition of the asteroid or the regolith or the asteroid based on the electrical output signal.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise software for determining a composition of an asteroid or the regolith of the asteroid. In one exemplary aspect, the units can comprise a computing device that comprises a processor 821 as illustrated in FIG. 8 and described below.

Figure 8:
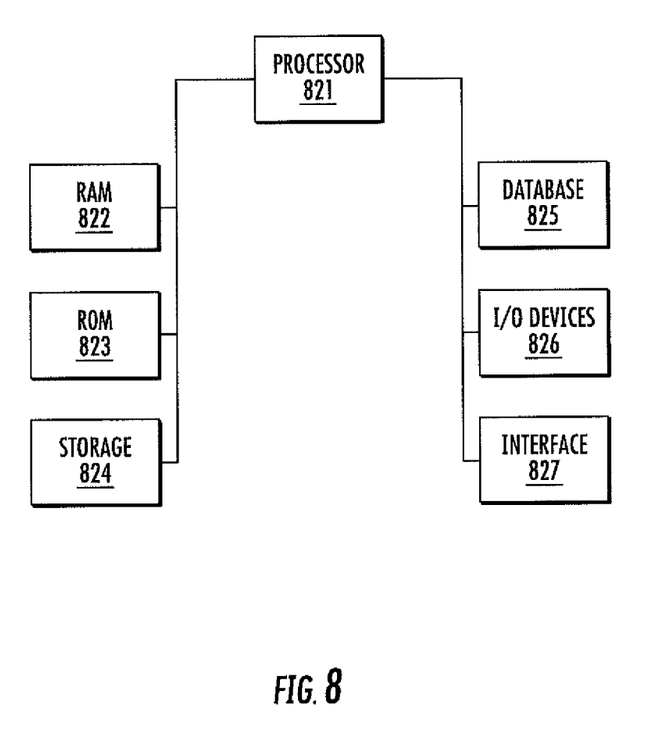
FIG. 8 illustrates an exemplary computer that can be used for determining a composition of an asteroid or the regolith of the asteroid.

FIG. 8 illustrates an exemplary computer that can be used for determining a composition of an asteroid or the regolith of the asteroid. In various aspects, the computer of FIG. 8 may comprise all or a portion of the photomultiplier 2, the analyzer 7, or any of the preamplifier 5 and amplifier 6 as described herein. As used herein, "computer" may include a plurality of computers. The computers may include one or more hardware components such as, for example, a processor 821, a random access memory (RAM) module 822, a read-only memory (ROM) module 823, a storage 824, a database 825, one or more input/output (I/O) devices 826, and an interface 827. Alternatively and/or additionally, controller 820 may include one or more software components such as, for example, a computer-readable medium including computer executable instructions for performing all or part of a method associated with the exemplary embodiments. It is contemplated that one or more of the hardware components listed above may be implemented using software. For example, storage 824 may include a software partition associated with one or more other hardware components. It is understood that the components listed above are exemplary only and not intended to be limiting.

Processor 821 may include one or more processors, each configured to execute instructions and process data to perform one or more functions associated with a computer determining a composition of an asteroid or the regolith of the asteroid. Processor 821 may be communicatively coupled to RAM 822, ROM 823, storage 824, database 825, I/O devices 826, and interface 827. Processor 821 may be configured to execute sequences of computer program instructions to perform various processes. The computer program instructions may be loaded into RAM 822 for execution by processor 821.

RAM 822 and ROM 823 may each include one or more devices for storing information associated with operation of processor 821. For example, ROM 823 may include a memory device configured to access and store information associated with controller 820, including information for identifying, initializing, and monitoring the operation of one or more components and subsystems. RAM 822 may include a memory device for storing data associated with one or more operations of processor 821. For example, ROM 823 may load instructions into RAM 822 for execution by processor 821.

Storage 824 may include any type of mass storage device configured to store information that processor 821 may need to perform processes consistent with the disclosed embodiments. For example, storage 824 may include one or more magnetic and/or optical disk devices, such as hard drives, CD-ROMs, DVD-ROMs, or any other type of mass media device.

Database 825 may include one or more software and/or hardware components that cooperate to store, organize, sort, filter, and/or arrange data used by controller 820 and/or processor 821. For example, database 825 may store the electrical output signal information as provided to the analyzer, and information that allows the analyzer to determine a composition of the asteroid or the regolith or the asteroid based on the electrical output signal. It is contemplated that database 825 may store additional and/or different information than that listed above.

I/O devices 826 may include one or more components configured to communicate information with a user associated with controller 820. For example, I/O devices may include a console with an integrated keyboard and mouse to allow a user to maintain a database of electrical output signal information and information that allows the analyzer to determine a composition of the asteroid or the regolith or the asteroid based on the electrical output signal. I/O devices 826 may also include a display including a graphical user interface (GUI) for outputting information on a monitor. I/O devices 826 may also include peripheral devices such as, for example, a printer for printing information associated with controller 820, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 827 may include one or more components configured to transmit and receive data via a communication network, such as the Internet, a local area network, a workstation peer-to-peer network, a direct link network, a wireless network, or any other suitable communication platform including a communications system that allows the gamma ray spectroscope system to be located on an asteroid, planet or other celestial body and send information to a monitoring station located on the earth or at a distance from the gamma ray spectroscope system. For example, interface 827 may include one or more modulators, demodulators, multiplexers, demultiplexers, network communication devices, wireless devices, antennas, modems, and any other type of device configured to enable data communication via a communication network.

An example of an application of the disclosed gamma ray spectroscope includes characterization of near-Earth objects such as the moon, asteroids, and planets due to an expansion of investigation of the extra-terrestrial for both scientific and economic purposes as described and disclosed in "Integration of a $^6$LiInSe$_2$ Thermal Neutron Detector into a CubeSat Instrument," Egner et al., Oct. 31, 2016—14 pages, DOI: 10.1117/1.JATIS.2.4.046001, e-Print: arXiv:1610.09801 [physics.ins-det], which is fully incorporated by reference and made a part hereof.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow;

plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A gamma ray spectroscope for use in space, said spectroscope comprising:
    a scintillator for transducing gamma radiation into light signals, said scintillator having a light yield of between 65,000 and 85,000 Ph/MeV and said light signals having a peak emission wavelength; and
    a solid-state silicon photomultiplier for detecting and amplifying the light signals transduced by the scintillator in response to the received radiation and wherein an electrical output signal is provided by the solid-state silicon photomultiplier that is proportional to one or more wavelengths of the received light signals,
    wherein the peak emission wavelength of the light signals are within 15 nm of a wavelength that produces a maximum electrical output signal of the solid-state silicon photomultiplier such that the gamma ray spectroscope consumes three Watts, or less, of electrical power.

2. The gamma ray spectroscope of claim 1, wherein the scintillator is comprised of a very high light output material.

3. The gamma ray spectroscope of claim 2, wherein the very high light output material comprises Strontium-Iodide doped with Europium.

4. The gamma ray spectroscope of claim 1, wherein the gamma ray spectroscope is used to determine a chemical composition of an asteroid based upon gamma rays emitted by the asteroid's regolith.

5. The gamma ray spectroscope of claim 4, wherein the gamma ray spectroscope is used to determine the chemical composition of the asteroid from a remote location.

6. The gamma ray spectroscope of claim 4, wherein the gamma ray spectroscope is used to determine the chemical composition of the asteroid when placed on the asteroid.

7. The gamma ray spectroscope of claim 1, wherein the gamma ray spectroscope weighs one kilogram or less and has exterior dimensions of 10 cm×10 cm×10 cm, or less and can operate in a temperature range of −5 C to 30 C.

8. The gamma ray spectroscope of claim 1, wherein the electrical output signal is proportional to an intensity and wavelength of the received radiation.

9. A system for use in space for determining a composition of regolith of an asteroid, said system comprising:
    a scintillator comprised of a $SrI_2$ crystal, wherein the scintillator receives radiation from an asteroid or regolith of the asteroid and emits light signals in proportion to an energy of the received radiation, said light signals having a peak emission wavelength;
    a solid-state silicon photomultiplier, wherein the solid state silicon photomultiplier detects and amplifies the light signals emitted by the scintillator in response to the received radiation and provides an electrical output signal that is proportional to one or more wavelengths of the received light signals and wherein the peak emission wavelength of the light signals are within 15 nm of a wavelength that produces a maximum electrical output signal of the solid-state silicon photomultiplier such that the gamma ray spectroscope consumes three Watts, or less, of electrical power;
    an amplifier, wherein the amplifier receives the electrical output signal from the photomultiplier and amplifies it;
    a spectrum analyzer, wherein the spectrum analyzer receives the amplified electrical output signal form the amplifier and determines a composition of the asteroid or the regolith of the asteroid based on the amplified electrical output signal;
    a power supply that provides the electrical power to the solid-state silicon photomultiplier, the amplifier and the spectrum analyzer; and
    a CubeSat chassis, wherein the scintillator, the solid-state silicon photomultiplier, the amplifier, the spectrum analyzer and the power supply all fit within the CubeSat chassis.

10. The system of claim 9, wherein the system is used to determine the chemical composition of the asteroid or the regolith of the asteroid from a location remote from the asteroid or when placed on the asteroid.

11. The system of claim 9, wherein the system weighs one pound or less.

12. A method of determining a composition of regolith of an asteroid using a gamma ray spectroscope in space, said method comprising:
    receiving, by a scintillator of the gamma ray spectroscope, radiation from an asteroid or regolith of the asteroid, wherein the scintillator emits light signals in proportion to an energy of the received radiation, said light signals having a peak emission wavelength;
    amplifying, by a solid-state silicon photomultiplier of the gamma ray spectroscope, the light signals emitted by the scintillator in response to the received radiation;
    providing, by the solid-state silicon photomultiplier, an electrical output signal that is proportional to a wavelength of the received light signals, wherein the peak emission wavelength of the light signals are within 15 nm of a wavelength that produces a maximum electrical output signal of the solid-state silicon photomultiplier such that the gamma ray spectroscope consumes three Watts, or less, of electrical power; and
    determining, by an analyzer, a composition of the asteroid or the regolith or the asteroid based on the electrical output signal.

13. The method of claim 12, wherein the scintillator is comprised of a very high light output material.

14. The method of claim 13, wherein the very high light output material comprises Strontium-Iodide doped with Europium.

15. The method of claim 12, wherein the radiation comprises gamma rays and the method further comprises determining a chemical composition of the asteroid or its regolith from the gamma rays.

16. The method of claim 12, wherein the scintillator, solid-state photomultiplier and analyzer are used to determine the chemical composition of the asteroid or its regolith from a location that is remote from the asteroid or from a location that is local to the asteroid.

\* \* \* \* \*

UNITED STATES PATENT AND TRADEMARK OFFICE
CERTIFICATE OF CORRECTION

PATENT NO. : 10,162,065 B2
APPLICATION NO. : 15/417659
DATED : December 25, 2018
INVENTOR(S) : Keivan Stassun et al.

Page 1 of 1

It is certified that error appears in the above-identified patent and that said Letters Patent is hereby corrected as shown below:

In the Claims

In Claim 9 at Column 12, Line 13, "receives the amplified electrical output signal form the..." should read ... "receives the amplified electrical output signal from the..."

In Claim 12 at Column 12, Line 50, "or the regolith or the asteroid based on the electrical..." should read ... "or the regolith of the asteroid based on the electrical..."

Signed and Sealed this
Nineteenth Day of March, 2019

Andrei Iancu
*Director of the United States Patent and Trademark Office*